United States Patent [19]

Anderson

[11] 4,029,704

[45] June 14, 1977

[54] OXIMES

[75] Inventor: Brian Anderson, Blackley, England

[73] Assignee: Imperial Chemical Industries Limited, London, England

[22] Filed: Aug. 12, 1975

[21] Appl. No.: 603,919

Related U.S. Application Data

[63] Continuation of Ser. No. 390,301, Aug. 21, 1973, abandoned.

[30] Foreign Application Priority Data

Aug. 25, 1972 United Kingdom ............ 39703/72
Feb. 23, 1973 United Kingdom ............ 8991/73
June 19, 1973 United Kingdom ............ 29003/73

[52] U.S. Cl. .................. 260/566 A; 260/429 C; 260/429.7; 260/429.9; 260/430; 260/431; 260/438.1; 260/439 R; 423/24; 252/182
[51] Int. Cl.² .............. C07C 131/00; C07C 131/14
[58] Field of Search .................. 260/566 A, 429 C; 252/182

[56] References Cited

UNITED STATES PATENTS

| 3,428,449 | 2/1969 | Swanson | 260/566 A |
| 3,579,556 | 5/1971 | Briggs | 260/566 A |
| 3,655,347 | 4/1972 | Mattison et al. | 260/566 A |

FOREIGN PATENTS OR APPLICATIONS

| 2,091,794 | 1/1972 | France | 260/566 A |
| 799,742 | 8/1958 | United Kingdom | 260/566 A |

OTHER PUBLICATIONS

Parrish, Chem. Abstr. vol. 74 col. 42077(p) (1971).
Farooq et al., Berichle vol. 94 pp. 1996-2001 (1961).

*Primary Examiner*—Gerald A. Schwartz
*Attorney, Agent, or Firm*—Cushman, Darby & Cushman

[57] ABSTRACT

O-Hydroxyphenyl benzyl ketoximes, preferably containing as substituents one or more alkyl or alkoxy groups containing a total of from 3 to 25 carbon atoms, are used to extract metals from aqueous solutions of their salts as complex compounds soluble in water-immiscible organic solvents. The ketoximes are prepared from the corresponding ketones by reaction with hydroxylamine.

2 Claims, No Drawings

OXIMES

This is a continuation of application Ser. No. 390,301 filed Aug. 21, 1973, now abandoned.

This invention relates to oximes, and more particularly to o-hydroxyphenyl benzyl ketoximes useful in the extraction of metal values from aqueous solutions of metal salts, especially from such solutions obtained in the course of extracting the metals from their ores.

One of the methods of extracting metals from their ores is to crush the ore and extract it with for example acids to give an aqueous solution of a salt of the desired metal, usually together with salts of other metals also present in the ore. The aqueous solutions may then be treated with a ligand which will form a complex compound with the desired metal under the conditions of treatment, which complex compound is soluble in water-immiscible organic solvent. The metal is extracted as the complex compound into a water-immiscible organic solvent. It is convenient to use a solution of ligand in the solvent and to carry out the treatment and extraction simultaneously. It has now been discovered that certain novel o-hydroxyphenyl benzyl ketoximes are especially valuable as ligands for use in this extraction method.

According to the invention there is provided a ketoxime of the formula

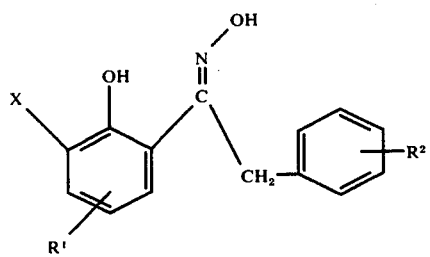

(I)

in which the oxime group is in the anti-configuration with respect to the hydroxyl group, wherein X is a hydrogen atom, a halogen atom, or an electron-withdrawing group and $R^1$ and $R^2$ which may be the same or different are each a hydrogen atom or an optionally substituted alkyl, alkenyl, cycloalkyl, alkoxy, alkenoxy, or aryloxy group.

As examples of halogen atoms which may be represented by X there is mentioned especially chlorine and bromine.

As examples of electron-withdrawing groups which may be represented by X there are mentioned cyano, nitro and trifluoromethyl.

X is preferably a hydrogen atom, in which case the oxime is especially suitable for extracting metal values from dilute solutions, for example up to 6 g. of copper per liter, or a chlorine or especially bromine atom, in which case the oxime is more suitable for use with more concentrated solutions of metal salts. It is preferred that X be not a bulky group as such groups interfere with formation of the metal complex compound.

As examples of groups which may be represented by R' there are mentioned alkyl groups which may be primary, secondary or tertiary and either straight-chain or branched, such as methyl, ethyl, butyl, octyl, nonyl, undecyl, and dodecyl, alkenyl groups such as allyl, dodecenyl, ocetenyl and decenyl, cycloalkyl groups such as cyclopentyl and cyclohexyl and substituted derivatives of these such as benzyl, octyloxymethyl, p-octylbenzyl and β-phenylethyl, alkoxy and alkenoxy groups derived from these optionally substituted alkyl and alkenyl groups, such as methoxy, ethoxy, tert.-butoxy, nonyloxy, dodecyloxy, aryloxy such as phenoxy, tolyloxy, p-octylphenoxy and p-nonylphenoxy, and substituted derivatives thereof such as benzyloxy, p-dodecylbenzyloxy.

$R^1$ is preferably an alkyl or alkoxy group containing from 3 to 18 carbon atoms since such groups enhance the solubility of the oxime and the drived metal complex in the organic solvent. The group $R^1$ may be in any free position on the benzene ring for example ortho to the group X but is preferably in the position para to the hydroxyl group.

$R^2$ is preferably a hydrogen atom or, if not a hydrogen atom, an alkyl or alkoxy group containing from 3 to 18 carbon atoms in order to provide enhanced solubility in the organic solvent. The group $R^2$ may be in any free position in the benzene ring. because of solubility requirements it is preferred that $R^1$ and $R^2$ should not both by hydrogen atoms. If each $R^1$ and $R^2$ are alkyl or alkoxy groups it is preferred that the total number of carbon atoms be from 3 to 25.

For complex formation to take place the oxime group must be in the anti-configuration with respect to the hydroxyl group, but mixtures of syn and anti oximes as normally obtained from hydroxylamine and ketone may be used in metal extraction processes, and such mixtures are a further feature of the invention.

There is also provided a process for the preparation of ketoximes of the invention which comprises reacting hydroxylamine with a ketone of the formula

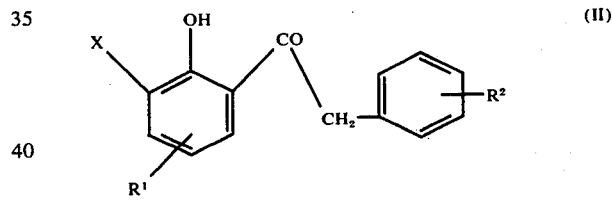

(II)

wherein X, $R^1$ and $R^2$ have the meanings given hereinbefore.

The process may be carried out in any conventional manner, conveniently by mixing approximately molar proportions of a hydroxylamine salt, such as the sulphate, and ketone in a solvent such as aqueous ethanol in presence of alkali to liberate hydroxylamine and heating the reactants at a temperature between 20° and 90° C until reaction is substantially complete (normally a few hours). After neutralization with acid the product can be extracted with a water-immiscible solvent such as chloroform or, if solid, collected by filtration.

The ketoxime in which the oxime group is in the anti configuration with respect of the hydroxyl group may be obtained free from the syn-isomer by treating the mixed ketoximes with a chelating metal salt, for example a copper salt in a suitable solvent in which both the oxime and the metal salt are soluble, for example methanol, separating the solid chelate from the unreacted oxime for example by removing the oxime by washing with an organic solvent such as methanol, and regenerating the oxime from the chelate by treatment with acid.

The ketone may be prepared by any conventional method, for example by reaction of e.g. alkylphenol or bromoalkyl phenol with phenylacetyl chloride in presence of a Friedel-Crafts catalyst such as aluminium chloride, or by preparing the ester from the phenol and phenylacetyl chloride and rearrangement of this by treatment with aluminium chloride. Mixtures of ketones may be used leading to mixtures of ketoximes.

According to the invention there is also provided a process for extracting metal values from aqueous solutions which comprises treating the aqueous solution with a solution in a water-immiscible organic solvent of an oxime of formula I and separating the organic solvent from the aqueous phase, the metal forming a complex with the ketoxime which complex is soluble in or associated with the organic solvent phase.

The process of the invention may be applied to the extraction of any metal which under the conditions of use, and in particular the pH of the aqueous solution, will form with the ketoxime a stable neutral complex which will dissolve in, or will completely associate with, the organic solvent. The stability of such complexes under various pH conditions will depend primarily on the metal, that from divalent copper being the most stable and complexes from other divalent metals such as nickel, cobalt, zinc and iron being progressively less stable to acid conditions. The formation of stable neutral complexes in the process of the invention is not restricted to metals in the divalent stage or to the above metals and other metals which may form such complexes include vanadium, tin, cadmium silver, gold and mercury.

The process of the invention is particularly suitable for the extraction of copper from aqueous solutions leached from ores containing this metal since the ketoximes used in the process of the invention form stable metal complexes with copper at the low pH values normally associated with these leach liquors. By operating at a pH less than 3, or in the cases wherein X is an electron-withdrawing group or a halogen atom such as bromine at a pH less than 2, copper may be extracted substantially free from nickel, cobalt and iron.

Since formation of the neutral complex compound usually involves the liberation of acid it may be necessary to add e.g. alkali during the process to maintain the pH within the desired group.

As organic solvent there may be used any mobile organic solvent or mixture of solvents which is immiscible with water and, under the pH conditions used, inert to water, to the metallic compounds, and to the ketoxime, for example aliphatic and aromatic hydrocarbons, chlorinated hydrocarbons, esters and ethers.

In order to facilitate separation of the aqueous and solvent phases it is desirable to use a solvent having a different density from that of the aqueous layer.

Depending upon the nature and concentration of the metal and ketoxime the complex may remain in solution in the organic solvent or may be formed in such amount that it will not all dissolve. In such cases the insoluble part of the complex will usually remain associated with the solvent as a suspension which can be separated from the aqueous phase without loss of the solid complex. When a suspension is formed it is preferred to use solvents which are more dense than the aqueous solutions since these, when containing the precipitated complex compounds which may tend to sink to the bottom of the solvent layer, are easier to separate from the aqueous layer than solvents less dense than water in which the suspended complex may tend to concentrate near the solvent-water interface. Examples of such dense solvents are halogenated hydrocarbons such as perchloroethylene, trichloroethane, trichloroethylene and chloroform.

The process may conveniently be carried out by bringing together the aqueous solution and a solution of the ketoxime in the organic solvent at a suitable temperature, conveniently ambient temperature, agitating or otherwise disturbing the mixture of liquids or that the area of the water-solvent interfacial layer is increased in order to promote complex formation and extraction, and then decreasing the agitation or disturbance so that the aqueous and solvent layers settle and can be conveniently separated. The process may be carried out in a batchwise manner or preferably continuously, in either case the solvent being if desired stripped of the metal content before re-use.

The relative amounts of organic solvent and aqueous solution may be varied widely as desired to be suitable in each case. It is, however, preferred especially when operating the process continuously to bring together equal volumes of the organic solution and the aqueous solution, adjusting the relative throughputs of the two liquid phases, if necessary, by recycling one through the mixing and separating processes.

The amount of ketoxime in relation to the amount of metal may be varied as desired between wide limits, although if a deficiency of ketoxime is used only partial removal of the metal can be achieved in a single extraction step. It is preferred to commence with a molar excess, for example up to 50%, of the ketoxime. The ratio of unextracted metal to free ketoxime will usually alter as the extraction proceeds. The amount of ketoxime in the organic solvent before extraction of metal is preferably between 2 and 50%.

If desired mixtures of oximes, for example wherein X is a bromine or hydrogen atom, may be used and may offer the advantage of increased solubility in the organic solvent. Particularly useful mixtures of oximes are those in which $R^1$ has different values, and in particular those derived by oximation of the ketone mixture obtained by introduction of the phenylacetyl group into the mixed nonylphenols resulting from condensation of phenol with propylene trimer. If desired a bromine atom can be introduced by bromination into the mixed nonyl phenols before acylation.

If desired other compounds, such as long chain ($C_8$–$C_{12}$) aliphatic alcohols, which may modify the formation and extraction of the complex compound or assist in the subsequent isolation of the metal from the organic solvent, or in the separation of the organic and aqueous phenols may also be present.

The addition of surface active agents such as ethylene oxide/alkyl phenol condensate is sometimes desirable in order to assist separation of the aqueous and organic phases by reducing any tendency to emulsification.

The metal may be isolated from the solvent after the extraction stage by any conventional process, for example by extraction into an aqueous phase under pH conditions in which the complex is unstable. Such a treatment will regenerate the oxime and the solvent containing oxime so recovered may conveniently be re-used in the process, especially when operated continuously. The oximes in which X is a halogen atom or electron-withdrawing group will usually require stronger acid for regeneration than those in which X is a hydrogen atom. The latter for example when used for extraction of copper values may be extracted satisfactorily with an aqueres solution containing 150 g. per liter of sulphuric acid, but more strongly acid solutions will be required for the former class of oximes. sulphurous, hydrochloric, The process of the invention may be applied especially to aqueous solutions resulting from treatment of mineral ores, scrap metal or other metal-containing residues with aqueous acids such as sulphuric, hydrochloric, or nitric acids or for example with aqueous ammonia or ammonium carbonate or to metal containing spent liquors from electrolytic or chemical processes.

The invention is illustrated but not limited by the following Examples in which all parts and percentages are by weight unless otherwise stated.

EXAMPLE 1

To a stirred solution of 200 parts of ethanol, 240 parts of water and 102 parts of 32% aqueous sodium hydroxide at 60° C are added 65.5 parts of benzyl 2-hydroxy-5-nonylphenyl ketone and 18 parts of hydroxylamine sulphate. The mixture is stirred under reflux for 2 hours, cooled to 20° C and neutralised by the addition of concentrated hydrochloric acid. The oily product is extracted into chloroform and the extract washed well with water, dried over anhydrous magnesium sulphate, filtered and evaporated to yield 56 parts of a viscous brown oil.

The crude oxime is dissolved in 100 parts of ethanol and added to 20 parts of cupric acetate dissolved in 300 parts of boiling methanol and the mixture stirred under reflux for 30 minutes. After cooling the solid copper complex is collected by filtration, washed with ethanol, and dissolved in 200 parts of chloroform. The chloroform solution is contacted three times with 200 parts of 20% sulphuric acid to remove the copper, washed acid free with water, dried over anhydrous magnesium sulphate and evaporated to dryness. 28 Parts of benzyl 2-hydroxy-5-nonylphenyl ketoxime in which the oxime group is in the anti configuration with respect to the hydroxyl group, are obtained as a light brown oil.

The benzyl-(2-hydroxy-5-nonylphenyl)ketone used in the above example may itself be prepared as follows:

To a stirring mixture of 150 parts dry monochlorobenzene, 44 parts of 4-nonylphenol, and 27 parts of aluminium chloride are added, 31 parts of phenylacetylchloride over 5-10 minutes and the mixture is stirred under reflux for 6 hours. After cooling, a solution of 120 parts of water and 58 parts of concentrated hydrochloric acid is added dropwise and the mixture then stirred reflux for a further 30 minutes. The stirring is stopped and the lower aqueous phase separated off. The organic solution is washed well with water, dried over anhydrous magnesium sulphate and the chlorobenzene solvent is removed by evaporation to yield 65.5 parts of benzyl-2-hydroxy-5-nonylphenyl ketone as a brown oil. The nonylphenol used above was obtained by alkylation of phenol with propylene trimer.

EXAMPLE 2

A 9.8% solution in kerosine of anti- benzyl 2-hydroxy-5-nonylphenyl ketoxime is shaken in a separating funnel at room temperature for 5 minutes with an equal volume of an aqueous feed solution containing 60 g. per liter of copper ion and having a pH of 2.0. The two phases are allowed to settle and then separated, and the copper content of the aqueous layer (raffinate) determined. The raffinate is extracted in a similar manner twice, on each occasion using a fresh solution of ketoxime. The results are given in Table 1 below.

|  | pH | Cooper content g/e |
|---|---|---|
| Feed solution | 2.0 | 6.00 |
| Raffinate 1st extraction | 1.3 | 2.82 |
| Raffinate 2nd extraction | 1.15 | 1.20 |
| Raffinate 3rd extraction | 1.05 | 0.50 |

EXAMPLE 3

100 Parts by volume of a kerosine solution containing 8.06 parts of 2-hydroxy-5-isodecyloxyphenyl benzylketoxime were shaken three times with 100 parts by volume of an aqueous solution at pH 2 of copper sulphate solution containing the equivalent of 3 g./liter of copper, each time with a fresh portion of the copper sulphate solution. The kerosine solution was then stripped of its copper by shaking twice with fresh 100 parts by volume portions of aqueous acid containing 150 g./liter of sulphuric acid and copper sulphate equivalent to 30 g./liter of copper. The residual copper in the kerosine solution was determined.

In a similar experiment the oxime solution was loaded in the same way but a strip acid containing 200 g./l sulphuric acid and copper sulphate equivalent to 30 g./l copper was used.

The results obtained are as follows:

Copper concentration of the loaded kerosine = 3.82 g./liter (The theoretical maximum copper uptake is 4.53 g./liter Copper concentration remaining in the stripped kerosine using 50 g./liter acid = 0.42 g./l.

Copper concentration remaining in the stripped kerosine using 200 g./liter acid = 0.254 g./l.

The 2-hydroxy-5-isodecyloxyphenyl benzyl ketoxime used in the above example was prepared by oximation of 2-hydroxy-5-isodecyloxyphenyl benzyl ketone by a similar method to that used in the preparation of the benzyl 2-hydroxy-5-nonylphenyl ketoxime of Example 1, followed by purification of the oxime through the solid copper complex.

The 2-hydroxy-5-isodecyloxyphenyl benzyl ketone was prepared by the alkylation of 2,5-dihydroxyphenyl benzyl ketone with isodecyl bromide in the following manner:

A mixture of 40.1 parts of 2,5-dihydroxyphenyl benzyl ketone, 42.7 parts of isodecylbromide, 48.5 parts of potassium carbonate and 400 parts of dry acetone was stirred under reflux for 120 hours. On cooling to 20° C the inorganic salts were filtered off and the acetone filtrates evaporated to give a brown oil. This residue was dissolved in 200 parts of petroleum ether, filtered to remove insoluble matter, and then washed with 4 × 50 parts of N sodium hydroxide solution and finally with water. The petrol solution was dried and evaporated to yield 42.4 parts of 2-hydroxy-5-isodecyloxyphenyl benzyl ketone as a brown oil.

The 2,5-dihydroxyphenyl benzyl ketone was prepared by the Friedel Crafts acylation of hydroquinone with phenyl acetylchloride in the presence of aluminium chloride using equimolar quantities of reactants, nitrobenzene solvent and a reaction temperature of 98° C for 6 hours.

EXAMPLE 4

The procedure of Example 3 was repeated replacing the 100 parts by volume of kerosine solution containing 8.06 parts of 2-hydroxy-5-isodecyloxyphenyl benzylketoxime by 100 parts by volume of a chloroform solution containing 4.28 parts of 2-hydroxy-5-tert.-amylphenyl benzyl ketoxime. The results were as follows:

Copper concentration of loaded chloroform = 3.86 g./liter (theoretical maximum uptake is 4.53 g./liter Copper concentration remaining in the stripped chloroform using 150 g./liter acid = 0.084 g./liter Copper concentration remaining in the stripped chloroform using 200 g./liter acid = 0.048 g./liter The 2-hydroxy-5-tert.-amylphenylbenzyl ketoxime used in the above example was prepared by oximation of 2-hydroxy-5-t-amylphenylbenzyl ketone by a similar method to that used in the preparation of the benzyl 2-hydroxy-5-nonylphenyl ketoxime of Example 1 and was purified through the solid copper complex.

The 2-hydroxy-5-tert.-amylphenyl benzyl ketone was prepared by the Fries re-arrangement of 4-tert.-amylphenyl phenylacetate using the following conditions.

A mixture of 125 parts of 4-tert.-amylphenyl phenylacetate, 150 parts of methylcyclohexane and 58.7 parts of aluminium chloride was stirred under reflux for 18 hours, cooled and added to a stirred mixture of 600 parts of water and 150 parts of concentrated hydrochloric acid. The mixture was allowed to settle and the organic layer separated off, washed well with water, three times with an equal volume of N sodium hydroxide solution and finally with water. The dried solution was evaporated to yield 86 parts of 2-hydroxy-5-tert.-amylphenyl benzyl ketone as a brown oil.

The 4-tert.-amylphenyl phenyl acetate was prepared by the reaction of 4-tert.-amylphenol with phenyl acetyl chloride at 100° C for 12 hours followed by distillation.

EXAMPLE 5

The procedure of Example 3 was repeated replacing the 100 parts by volume of kerosine solution containing 8.06 parts 2-hydroxy-5-isodecyloxyphenyl ketoxime by 100 parts by volume of a kerosine solution containing 7.3 parts of 2-hydroxy-4-isodecyloxyphenyl benzyl ketoxine. The results were as follows:

Copper concentration of the loaded kerosine = 4.34 g./liter (theoretical maximum copper uptake is 4.65 g./liter Copper concentration in stripped kerosine using 150 g./liter acid = 1.24 g./liter Copper concentration in stripped kerosine using 200 g./liter acid = 0.65 g./liter.

The 2-hydroxy-4-isodecyloxyphenyl benzyl ketone used in the above example was prepared by oximation of 2-hydroxy-4-isodecyloxyphenyl benzyl ketone by a similar method to that used in the preparation of benzyl-2-hydroxy-5-nonylphenyl ketoxine of Example 1 including purification through the solid copper complex.

The 2-hydroxy-4-isodecyloxyphenyl benzyl ketone was prepared by alkylation of 2,4-dihydroxyphenyl benzyl ketone with isodecyloxy bromide as follows:

A mixture of 22.8 parts of 2,4-dihydroxyphenyl benzyl ketone, 22.1 parts of isodecyl bromide, 27.6 g. anhydrous potassium carbonate and 250 parts of dry acetone was stirred under reflux for 3 days. After cooling and filtering the filtrates were evaporated to dryness, the residue dissolved in petrol ether and the solution filtered. The filtrates well washed with 4 × 50 parts of N sodium hydroxide solution followed by 5 × 100 parts of water. The dried petrol solution was evaporated to give 26.2 parts of 2-hydroxy-4-isodecyloxyphenyl benzyl ketone as a dark, viscous oil.

The 2,4-dihydroxyphenol benzyl ketone was prepared by treating a mixture of 100 parts of resorcinol, 100 parts of benzyl cyanide and 20 parts of anhydrous zinc chloride in dry ether with hydrogen chloride gas saturated. After standing for 2 days the lower oily layer was separated off, washed with ether by decantation and boiled with 200 parts of water for 2 hours. After cooling the yellow crystals were collected by filtrate and dried. Crystallisation from benzene gave 2,4-dihydroxyphenyl benzyl ketone as yellow/orange crystals, melting at 113°-114° C.

EXAMPLE 6

The procedure of Example 3 was repeated replacing the 100 parts by volume of a kerosine solution containing 8.06 parts of 2-hydroxy-5-isodecyloxyphenyl benzyl ketoximes by 100 parts by volume of a perchloroethylene solution containing 8.22 parts of the 2-hydroxy-4-decylphenyl benzyl ketoximes.

The results were as follows:

Copper concentration of loaded perchloroethylene = 4.37 g./liter (theoretical maximum copper loading = 4.55 g./liter)

Copper remaining in stripped perchloroethylene using 150 g./liter acid = 0.724

Copper remaining in stripped perchloroethylene using 200 g./liter acid = 0.37

The 2-hydroxy-4-n-pentadecylphenyl benzyl ketoxime used in the above example was prepared by oximation of 2-hydroxy-4-pentadecylphenyl benzyl ketone by a similar method to that used in the preparation of benzyl-2-hydroxy-5-nonylphenyl ketoxime of Example 1.

The 2-hydroxy-4-n-pentadecylphenyl benzyl ketone was prepared by the Fries re-arrangement of 3-n-pentadecyl phenyl phenyl acetate in a similar manner to the preparation of 2-hydroxy-5-tert.-amylphenyl benzyl ketone in Example 4 except that chlorobenzene was used as solvent in place of methylcyclohexane.

EXAMPLE 7

The procedure of Example 3 was repeated replacing the 100 parts by volume of a kerosine solution containing 8.06 parts of 2-hydroxy-5-isodecyoxyphenyl benzyl ketoxime by 100 parts by volume of a kerosine solution containing 9.6 parts of 2-hydroxy-5-tert.-amylphenyl 4-dodecylbenzyl ketoximes.

The results were as follows:

Copper concentration loaded kerosine = 3.53 g./liter (theoretical maximum copper loading = 4.54 g./liter)

Copper remaining in stripped kerosine using 150 g./liter acid = 0.24 g./liter

Copper remaining in stripped kerosine using 200 g./liter acid = 0.178 g./liter

The 2-hydroxy-5-tert.-anylphenyl 4-dodecylbenzyl ketoxime used in the above example was prepared by oximation of 2-hydroxy-5-tert.-amylphenyl 4-dodecylbenzyl ketone by a method similar to that used in the preparation of benzyl-2-hydroxy-5-nonylphenyl 5 ketoxime of Example 1.

The 2-hydroxy-5-tert.-amylphenyl 4-dodecylbenzyl ketone was prepared by a Fries re-arrangement of 4-tert.-amylphenyl 4-dodecylphenylacetate by a method similar to that used in the preparation of 2-hydroxy-5-t-amylphenyl benzyl ketone of Example 4.

The 4-tert.-amylphenyl 4-dodecylphenylacetone was prepared by the reaction of 4-tert.-amylphenol and 4-dodecylphenyl acetyl chloride at 100° C over 12 hours. The 4-dodecylphenyl acetyl chloride was prepared starting from dodecylbenzene by conversion to 4-dodecylbenzyl chloride and then to 4-dodecylbenzyl cyanide followed by hydrolysis to 4-dodecylphenyl acetic acid and finally treatment with thionyl chloride to give the 4-dodecylphenyl acetyl chloride.

EXAMPLE 8

100 Parts of volume of a kerosine solution containing 15.22 parts of 2-hydroxy-3-chloro-5-nonylphenylbenzene ketoxime was shaken for 3 minutes with 100 parts by volume of an aqueous solution as pH 2.0 of copper sulphate containing the equivalent of 12 g./liter of copper. The two phases were allowed to settle, separated off and the copper content of the aqueous layer determined. The raffinate was extracted in a similar manner twice more, on each occasion using a fresh solution of ketoxime. The results are given in the following table.

|  | pH | Copper concentration g/liter |
|---|---|---|
| Feed solution | 2.0 | 12.00 |
| Raffinate 1st extraction | 1.15 | 3.81 |
| Raffinate 2nd extraction | 0.96 | 0.56 |
| Raffinate 3rd extraction | 0.94 | 0.007 |

The 2-hydroxy-3-chloro-5-nonylphenyl benzyl ketoxime used in the above example was prepared by oximation of 2-hydroxy-3-chloro-5-nonylphenyl ketone by a similar method to that used in the preparation of the benzyl 2-hydroxy-5-nonyl-phenyl ketoxime of Example 1.

The 2-hydroxy-3-chloro-5-nonylphenyl benzyl ketone was prepared as follows:

A mixture of 93 parts 2-chloro-4-nonylphenyl phenylacetate, 200 parts of methyl cyclohexane and 34 parts aluminium chloride was stirred under reflux for 18 hours. After cooling a mixture of 150 parts of water and 60 parts of concentrated hydrochloric acid was added continuously allowing the temperature to rise to 60°–70° C. After stirring for a further 30 minutes the mixture was allowed to settle and the aqueous layer run off. The organic layer was then washed with water, twice with 200 parts of a sodium hydroxide solution and finally with water. After drying the solvent was removed by evaporation under vacuum. 72 Parts of 2-hydroxy-3-chloro-5-nonylphenyl benzyl ketone were obtained as a brown oil. Examination by Infra-Red showed the presence of a ketone adsorption at 1640 $CM^{-1}$.

The 2-chloro-4-nonylphenyl phenyl acetate was prepared by the interaction of equimolar quantities of 2-chloro-4-nonylphenol and phenylacetyl chloride at 100° C over 18 hours.

The 2-chloro-4-nonylphenyl itself was obtained by chlorination of nonylphenol using sulphonyl chloride.

EXAMPLE 9

The procedure of Example 3 was repeated replacing the 100 parts by volume of a kerosine solution of 8.06 parts of 2-hydroxy-5-isodecyloxyphenyl benzyl ketoxime by 100 parts of a kerosine solution containing 14.73 parts of 2-hydroxy-3-chloro-5-isodecyloxyphenyl benzylketoxime.

The results were as follows:
Copper concentration of the loaded kerosine = 3.94 g./liter (theoretical maximum copper loading = 4.50 g./liter)
Copper remaining in the stripped kerosine using 200 g./liter acid = 2.3 g./liter The 2-hydroxy-3-chloro-5-isodecyloxyphenyl benzyl ketoxime used in the above example was prepared by oximation of 2-hydroxy-3-chloro-5-isodecyloxyphenyl benzyl ketone by a similar method to that used in the position of benzyl 2-hydroxy-5-nonylphenyl ketoxime of Example 1.

The 2-hydroxy-3-chloro-5-isodecyloxy phenyl benzyl ketone was prepared from 2-chlorohydroquinone by a method similar to that used in the preparation of 2-hydroxy-5-isodecyloxyphenyl benzylketone of Example 3.

EXAMPLE 10

The procedure of Example 3 was repeated replacing the 100 parts by volume of a kerosine solution containing 8.06 parts 2-hydroxy-5-isodecyloxyphenyl benzyl ketoxime by 100 parts of a kerosine solution containing 6.36 parts of benzyl 2-hydroxy-5-nonylphenyl ketoxime and 19.2 parts of benzyl-2-hydroxy-3-bromo-5-nonyl phenyl ketoxime.

The results were as follows:
Copper concentration of the loaded kerosine = 14.67 g./liter (theoretical maximum loading = 15.00 g./liter)
Copper concentration of the stripped kerosine using 150 g./liter acid = 8.07 g./liter
Copper concentration of the stripped kerosine using 200 g./liter acid = 6.57 g./liter

EXAMPLE 11

To a stirred solution of 200 parts of ethanol, 240 parts of water and 102 parts of 32% aqueous sodium hydroxide at 60° C are added 83.5 parts of benzyl 2-hydroxy-3-bromo-5-nonylphenyl ketone and 18 parts of hydroxylamine sulphate. The mixture is stirred under reflux for 2 hours, cooled to 20° C and neutralised by the addition of concentrated hydrochloric acid. The oily product is extracted into chloroform and the extract washed well with water, dried over anhydrous magnesium sulphate, filtered and evaporated to yield 79.6 parts of a brown oil.

The crude oxime is dissolved in 100 parts of ethanol and added to 20 parts of cupric acetate dissolved in 300 parts of boiling methanol and the mixture stirred under reflux for 30 minutes. After cooling the copper complex is separated off by decantation and dissolved in 200 parts of chloroform. The chloroform solution is contacted twice with 250 parts of 20% sulphuric acid to remove the copper, washed acid free with water, dried over anhydrous magnesium sulphate and evaporated to dryness. The benzyl 2-hydroxy-3-bromo-5-nonylphenylketoxime, in which the oxime groups is in the anti configuration with respect to the hydroxyl group, is obtained as a brown oil of strength 86.5% as measured by copper uptake.

The benzyl-2-hydroxy-3-bromo-5-nonylphenylketone used in the above example may be measured as follows:

A mixture of 295 parts of 2-bromo-4-nonylphenyl-α-phenyl acetate, 600 parts of methyl cyclohexane and 24 parts of aluminium chloride is stirred under reflux for 17 hours. After cooling a solution of 200 parts of water and 100 parts of concentrated hydrochloric acid is added cautiously allowing the temperature to rise to 70° C. The mixture is allowed to settle and the aqueous layer separated off, the methyl cyclohexane solution is then washed with water, twice with 500 parts of 5% sodium hydroxide solution and finally with water. After drying, the solution is evaporated down to yield 245 parts of benzyl 2-hydroxy-3-bromo-5-nonylphenyl ketone. Inspection of the infrared absorption spectra of the product showed that a considerable amount of ester had been converted into ketone.

The 2-bromo-4-nonylphenyl-α-phenyl acetate is obtained by esterification of 2-bromo-4-nonylphenol with phenyl acetyl chloride by heating the two reactants in equimolar quantities at 100° C for 12 hours.

The 2-bromo-4-nonylphenol is obtained by the bromination at ambient temperatures of p-nonyl phenyl in a solvent such as acetic acid or carbon tetrachloride. The 2-bromo-4-nonyl phenol may be distilled at 120° - 124° C under a pressure of 0.2 mm. of mercury.

The p-nonyl phenol is obtained by the interaction of propylene trimer with phenol followed by fractionation of the product to remove dinonylphenol.

Alternatively the benzyl-2-hydroxy-3-bromo-5-nonylphenyl ketone may be prepared as follows:

A mixture of 33.8 parts of benzyl 2-hydroxy-5-nonyl phenyl ketone, 150 parts of methyl cyclohexane was stirred at 20° C with 150 parts of water and 16.4 parts of anhydrous sodium acetate and 21 parts of bromine was added dropwise over 20–30 minutes. The reaction mixture was stirred for a further 2 hours, drowned into water, allowed to settle and the aqueous layer ran off. The methylcyclohexane solution was then washed well with water, dried and evaporated to dryness to yield 37.4 parts of benzyl-2-hydroxy-3-bromo-5-nonylphenyl ketone as a yellow oil.

EXAMPLE 12

150 Parts of a 9.5% solution in kerosine of benzyl 2-hydroxy-3-bromo-5-nonylphenylketone anti-oxime as prepared in Example 11 is shaken in a separating funnel at room temperature for 3 minutes with 100 parts of an aqueous feed solution containing 12 g./liter of copper ion and having a pH of 2. The two phases are allowed to settle and are then separated and the copper concentration of the aqueous layer (raffinate) determined. The raffinate is extracted in a similar manner twice more, on each occasion using a fresh solution of ketoxime. The results are given in Table 1 below.

|  | Copper content g/l. |
|---|---|
| Feed solution | 12.0 |
| Raffinate after 1st extraction | 5.70 |
| Raffinate after 2nd extraction | 2.375 |
| Raffinate after 3rd extraction | 0.03 |

I claim:
1. A ketoxime of the formula

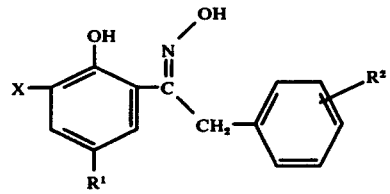

wherein the oxime is in the anti configuration with respect to the phenolic hydroxyl group, X and $R^2$ are hydrogen and $R^1$ is a nonyl group.

2. A mixture of ketoximes as claimed in claim 1, wherein individual ketoximes of the said mixture differ in the configuration of the nonyl group.

* * * * *